(12) United States Patent
Wisse et al.

(10) Patent No.: US 9,622,455 B2
(45) Date of Patent: Apr. 18, 2017

(54) FEED SYSTEM AND METHOD FOR THE FEEDING OF ANIMALS

(71) Applicant: LELY PATENT N.V., Maassluis (NL)

(72) Inventors: Dik-Jan Wisse, Maassluis (NL); Jan Martinus Van Kuilenburg, Maassluis (NL); Karel Van Den Berg, Maassluis (NL); Pieter Jacob Kik, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 6 days.

(21) Appl. No.: 14/391,150

(22) PCT Filed: Mar. 14, 2013

(86) PCT No.: PCT/NL2013/050175
§ 371 (c)(1),
(2) Date: Oct. 7, 2014

(87) PCT Pub. No.: WO2013/157928
PCT Pub. Date: Oct. 24, 2013

(65) Prior Publication Data
US 2015/0075436 A1    Mar. 19, 2015

(30) Foreign Application Priority Data
Apr. 20, 2012 (NL) ...................................... 2008671

(51) Int. Cl.
*A01K 1/00* (2006.01)
*A01K 5/02* (2006.01)
(Continued)

(52) U.S. Cl.
CPC .............. *A01K 5/02* (2013.01); *A01K 5/0266* (2013.01); *G01C 21/00* (2013.01); *G05D 1/021* (2013.01)

(58) Field of Classification Search
CPC .... G01C 21/00; G01C 21/3407; G05D 1/021; A01K 5/02; A01K 5/0266; A01K 1/00;
(Continued)

(56) References Cited

U.S. PATENT DOCUMENTS 5,008,821 A * 4/1991 Pratt ........................ A01K 5/02
119/51.01
5,069,165 A * 12/1991 Rousseau ............. A01K 5/0266
119/51.02
(Continued)

FOREIGN PATENT DOCUMENTS

NL          1033907 C1     9/2007
WO     WO 96/14735 A1     5/1996
(Continued)

*Primary Examiner* — Jennifer E Novosad
(74) *Attorney, Agent, or Firm* — Birch, Stewart, Kolasch & Birch, LLP

(57) ABSTRACT

A feed system (1) for the feeding of animals, comprising: —a feed wagon (3), having: •a holder (4), •a dispensing device (5), •a regulating unit (8), comprising a sending and receiving device (9), and being connected to a drive and control system, and —a feed loading device (12), —a feed site, —a central control system (16) provided with a sending and receiving device (17) which is configured to communicate wirelessly with the sending and receiving device of the regulating unit, and comprising a memory in which are stored navigation data on the basis of which the feed wagon is capable of covering a route from the feed loading site to the feed site, and wherein the central control system transmits a packet of data comprising these navigation data to the regulating unit. The regulating unit regulates the drive and control system on the basis of that packet of data.

20 Claims, 1 Drawing Sheet

(51) Int. Cl.
*G01C 21/00* (2006.01)
*G05D 1/02* (2006.01)

(58) Field of Classification Search
CPC .......... A01K 1/0209; A01K 1/10; A01K 5/00;
A01K 5/001; A01K 5/005; A01K 5/0107;
A01K 5/0275; A01K 5/0283; A01K
31/18; A01K 31/22; A01K 39/00
USPC .... 119/51.01, 51.02, 57.5, 57.6, 57.92, 52.1,
119/52.4, 53, 56.1, 56.2, 57.1, 436, 444,
119/449, 503, 515, 518, 520, 521;
701/50, 532, 533, 500
See application file for complete search history.

(56) References Cited

U.S. PATENT DOCUMENTS

| | | | |
|---|---|---|---|
| 5,255,195 A * | 10/1993 | Mochizuki | G01C 21/28 180/169 |
| 5,355,833 A * | 10/1994 | Legrain | A01K 9/00 119/51.02 |
| 5,424,957 A * | 6/1995 | Kerkhoff | A01K 5/0275 119/51.02 |
| 5,457,627 A * | 10/1995 | Cureton | A01K 5/02 119/51.01 |
| 5,816,192 A * | 10/1998 | van der Lely | A01K 5/00 119/57.92 |
| 6,216,053 B1 * | 4/2001 | Cureton | A01K 5/02 348/E13.004 |
| 6,745,126 B1 * | 6/2004 | Pavlak | A01K 5/02 342/357.75 |
| 7,689,434 B2 * | 3/2010 | Cureton | A01K 5/02 705/1.1 |
| 8,397,670 B2 * | 3/2013 | Van Den Berg | A01K 5/02 119/14.11 |
| 8,612,083 B2 * | 12/2013 | Van Den Berg | G05D 1/021 15/319 |
| 8,655,751 B2 * | 2/2014 | Renz | G06Q 10/0875 119/51.01 |
| 2010/0326363 A1 * | 12/2010 | Van Den Berg | A01K 1/105 119/57.92 |
| 2015/0075436 A1 * | 3/2015 | Wisse | A01K 5/02 119/57.92 |
| 2015/0230427 A1 * | 8/2015 | Wisse | A01K 5/02 701/2 |
| 2015/0250137 A1 * | 9/2015 | Palsgaard | A01K 5/00 119/57.92 |

FOREIGN PATENT DOCUMENTS

WO  WO 2007/071406 A2  6/2007
WO  WO 2008/097080 A1  8/2008

\* cited by examiner

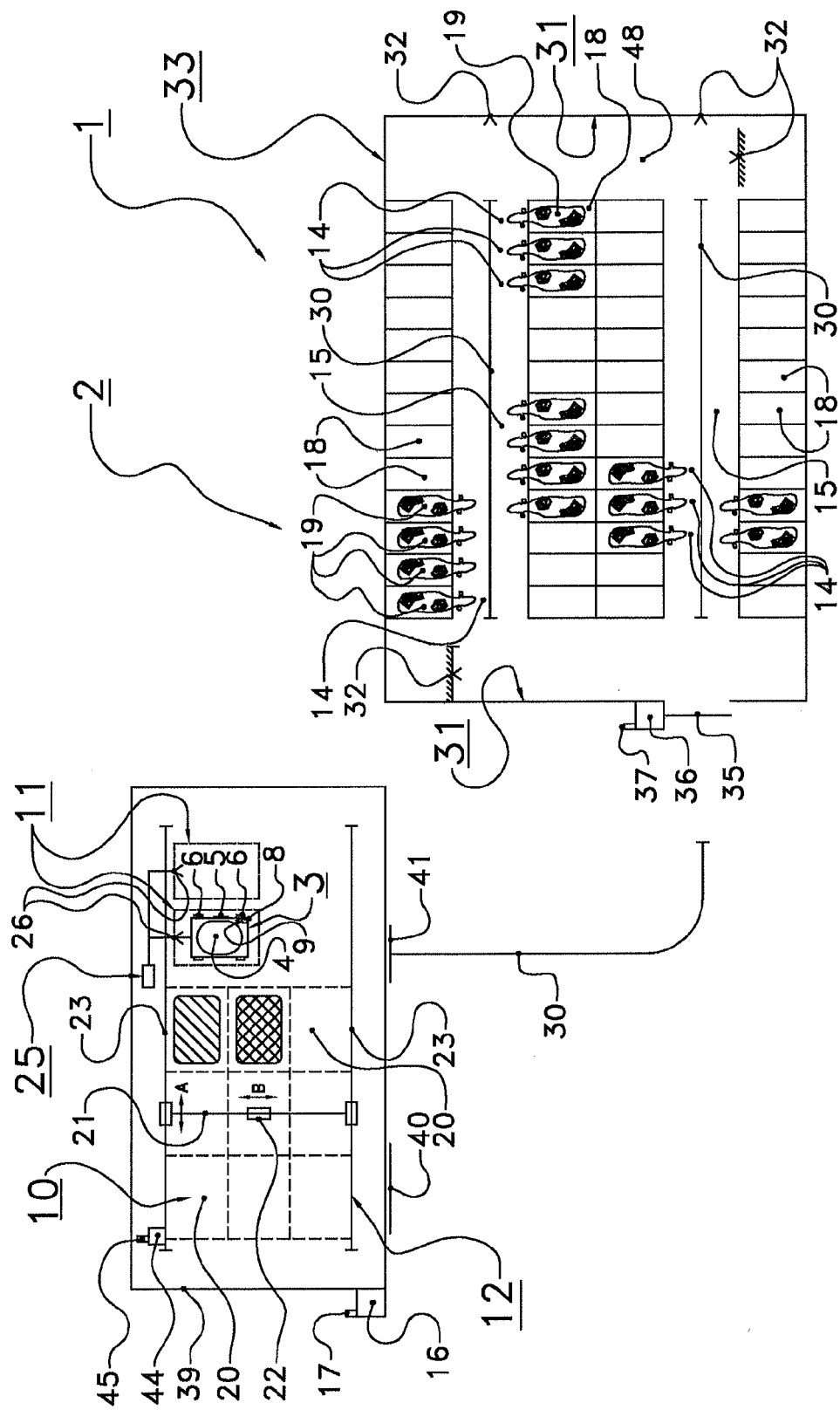

FEED SYSTEM AND METHOD FOR THE FEEDING OF ANIMALS

The invention relates to a feed system for the feeding of animals.

A feed wagon for the feeding of silage and/or concentrate to animals, such as cattle, is known from EP 0739161. The feed wagon is here automatically displaceable between one or more feed loading sites and one or more feed unloading sites, such as the stalls for the animals. The stalls are placed in a shed along a feed alley, wherein the stalls run transversely to the feed alley and the animals stand with their head facing the feed alley. The feed loading sites are formed by feed pits or silos. During operation, the feed wagon takes its bearings from beacons, which are each separately identifiable. The feed wagon comprises an on-board computer and communication means for exchanging information and instructions with a central computer. Into the on-board computer of the feed wagon are inputted the data relating to all the placed beacons, together with the associated object or path of travel and the dimensions thereof. The dimensions and sites of beacons are programmed once by the farmer when the feed wagon is first used. This is done by means of a run accompanied by the farmer, wherein the feed wagon is steered manually along the desired route and objects which are suitable as a beacon are chosen as such by the farmer and recorded in the on-board computer. After this, the feed wagon makes as many runs along the set route as is necessary for the supply of feed or according to the central computer. En route, the two beacons which are detected as the closest are here constantly used for the computerized determination of the position, orientation and speed of travel of the feed wagon. In the case of this feed wagon, all farm-specific data are thus stored in the memory of the on-board computer. If the feed wagon has to be replaced by a replacement feed wagon, for example in the event of a fault or theft, the replacement feed wagon must be newly programmed with the farm-specific data. Also if there is need for a second feed wagon in addition to the first feed wagon, the farm-specific data must be newly programmed into the second feed wagon. If the feed wagon is stolen, it is a drawback, moreover, that confidential operating information of the farm from the memory of the on-board computer can end up in the wrong hands.

One object of the invention is to provide an improved feed system for the feeding of animals, in particular a feed system which can be enduringly safe and reliable in operation.

This object is achieved according to the invention by a feed system for the feeding of animals, which feed system comprises:
  an operating zone having a ground surface,
  a feed wagon, which is provided with:
    a holder for the reception of food,
    a dispensing device for the dispensing of feed held in the holder,
    a plurality of wheels, which are transportable over the ground surface,
    a drive and control system for driving and controlling the feed wagon,
    a regulating unit, which is provided with a sending and receiving device, which regulating unit is connected to the drive and control system for the regulation thereof, and
  a feed storage system for holding at least one variety of feed,
  a feed loading site for the feed wagon, which feed loading site is located in the operating zone,
  a feed loading device, which is configured to transfer feed from the feed storage system to the holder of the feed wagon when the feed wagon is stationed at the feed loading site,
  a feed site for the feeding of the animals, which feed site is located in the operating zone at a distance from the feed loading site, and which feed site is reachable for the feed wagon from the feed loading site by transporting of the feed wagon, with its wheels. over the ground surface,
  a central control system, which is provided with a sending and receiving device which is configured to communicate, preferably wirelessly, with the sending and receiving device of the regulating unit of the feed wagon,
wherein the central control system is provided with a memory in which are stored data comprising navigation data on the basis of which the feed wagon is capable of covering an entire route from the feed loading site to the feed site, and the central control system is configured to transmit a packet of data comprising these navigation data from the sending and receiving device of the central control system to the sending and receiving device of the regulating unit of the feed wagon, and the regulating unit of the feed wagon is provided with a memory for the storage of that packet of data, and the regulating unit of the feed wagon is configured to regulate the drive and control system of the feed wagon, on the basis of that packet of data, for the running of the feed wagon from the feed loading site to the feed site.

According to the invention, the farm-specific data are stored in the memory of the central control unit. The sending and receiving device of the central control system has a transmission range. Depending on the dimensions of the operating zone of the farm, the locations of the feed loading site, the feed site and the sending and receiving device of the central control system in the operating zone, and the presence of any sheds, barns and other buildings, communication between the sending and receiving device of the central control system and the sending and receiving device of the regulating unit of the feed wagon can be temporarily disrupted, or may even be impossible, when the feed wagon is en route from the feed loading site to the feed site. According to the invention, en-route communication is unnecessary, however, since in the memory of the regulating unit of the feed wagon is stored a packet of data comprising navigation data on the basis of which the feed wagon is capable of covering the entire route from the feed loading site to the feed site. The navigation data comprise, for example, a collection of various navigation instructions. The packet of data comprising the navigation data is transmitted to the sending and receiving device of the regulating unit of the feed wagon while this sending and receiving device is located within the transmission range of the sending and receiving device of the central control system and is connected thereto. The packet of data comprising the navigation data is stored in the memory of the regulating unit, so that the feed wagon can subsequently cover the desired route autonomously without further communication with the central control unit.

At the same time, nor are all farm-specific data stored permanently in the memory of the regulating unit. The totality of farm-specific data which are necessary for the working of the system is stored in the memory of the central control system. If a second feed wagon is added, this second feed wagon can easily be controlled on the basis of the same farm-specific data from the central control system. The entry into service of a second feed wagon is hereby fast and simple. Furthermore, if a feed wagon is stolen, it is an advantage that only a limited quantity of data is stored in the memory of the regulating unit of the feed wagon, so that the risk of confidential information of the farm ending up in the wrong hands is reduced. Advantageously, the limited quantity of data is stored in a dynamic memory, which is wiped whenever the feed wagon is switched off, or whenever an alarm instruction is received.

It is noted that a feed system for the feeding of animals is also known from WO 2008/097080. This feed system comprises an autonomous feed wagon and a store having a plurality of silos of different feed varieties. The system is configured to deliver feed to cattle which are standing, for example, by a feeding rack in a shed. A trolley having a grab obtains via a central control system the order to pack a specific quantity of feed from a specific silo. After a quantity of feed has been packed, the grab holds the feed while the trolley moves to a filling site where the feed wagon stands ready. The grab drops the quantity of feed at the filling site into the feed wagon, after which the feed is released in the feed wagon. The grab next brings a second quantity of feed from a predefined silo into the feed wagon, which is mixed with the feed which is already in the feed wagon. This is repeated until the desired quantity of feed in the desired composition is present in the feed wagon. The feed wagon subsequently leaves the filling site and travels to the shed, after which the feed is released from the feed wagon at the feeding rack. The autonomous feed wagon can find its way by means of guides, beacons or sensors. For this it is likewise necessary, however, that the data relating to all beacons, together with the associated object or path of travel and the dimensions thereof, are inputted into a control unit on board the feed wagon. The above-stated drawbacks of the feed wagon according to EP 0739161 are applicable here too. If the feed wagon has to be replaced by a replacement feed wagon, for example in the event of a fault or theft, the replacement feed wagon has to be newly programmed with the farm-specific data. Also if there is a need to use an extra feed wagon, the farm-specific data must be newly programmed into the extra feed wagon. If the feed wagon is stolen, there is also the risk that confidential operating information from the memory of the feed wagon will end up in the wrong hands. According to this document, moreover, guidance by means of GPS is also possible. Navigation of the feed wagon on the basis of GPS gives rise, however, to connection problems, above all within a shed, whereby the feed wagon can no longer travel autonomously.

It is further noted that WO 2007/071406 discloses a dairy farming system in which a feed wagon is displaceably suspended from a rail attached to the ceiling of a milking shed. The feed wagon moves automatically between a first site and a number of second sites. The first site forms a loading site, in which the battery of the feed wagon is charged, and/or a filling site for the filling of the feed wagon. The second sites are feed sites for the delivery of feed to cattle. In this document, it is described as the prior art that the feed wagon is connected in the loading site via an infrared connection to a network, in order to receive feed instructions. Since the feed wagon is guided by the rails, the route to the feed sites is given by the rails and no navigation instructions for the traversing of this route are necessary. As the loading site is left, the infrared connection is broken, and when the feed wagon returns to the loading site after the feeding the infrared connection can be restored. In this document it is described as a drawback that the infrared connection does not always function well and that the infrared connection can only be realized when the feed wagon is parked in the loading site. If the feed wagon stops elsewhere, for example during the feeding, no communication with the feed wagon is possible. As a solution, this document teaches to keep the feed wagon continuously connected to the network via a Bluetooth connection. The present invention thus runs counter to the teaching of this document: in contrast to the teaching of this document, the feed system according to the invention is configured precisely such that the connection between the feed mixing truck and the central control unit may be lost. After the packet of navigation data has been sent to the feed wagon according to the invention, no communication with the central control unit is any longer necessary until the feed wagon has reached the destination. This results in high reliability of the system according to the invention, since the size of the farmstead and the sheds, barns and other buildings present thereon can in practice give connection problems.

In one embodiment of the invention; the data which are stored in the memory of the central control system comprise navigation data on the basis of which the feed wagon is capable of covering an entire route from the feed loading site to the feed site and back to the feed loading site. The packet of data which is transmitted from the sending and receiving device of the central control system to the sending and receiving device of the regulating unit of the feed wagon and is stored in the memory of the regulating unit of the feed wagon comprises these navigation data. The regulating unit of the feed wagon is configured to regulate the drive and control system of the feed wagon, on the basis of that packet of data, for the running of the feed wagon from the feed loading site to the feed site and back. The regulating unit of the feed wagon can therefore, on the basis of the received packet of data, regulate the drive and control system of the feed wagon such that the feed wagon can travel also back to the feed loading site without communication with the central control unit. The central control system is preferably configured to, after the return of the feed wagon to the feed loading site, transmit a further packet of data from the sending and receiving device of the central control system to the sending and receiving device of the regulating unit of the feed wagon. On the basis of that further packet of data, the regulating unit of the feed wagon then again regulates the drive and control system of the feed wagon.

In a preferred embodiment, the feed system is provided with a plurality of feed sites, wherein the data which are stored in the memory of the central control system comprise navigation data on the basis of which the feed wagon is capable of covering an entire route from the feed loading site to respectively at least one of the feed sites and possibly back to the feed loading site, and wherein at least one of the feed sites can be selected in the central control system, and wherein the central control system is configured to define a packet of data from the data stored in the memory of the central control system such that that packet of data is provided with navigation data on the basis of which the feed wagon is capable of covering an entire route from the feed loading site to the selected feed site or feed sites and possibly back to the feed loading site, and wherein the central control system is configured to transmit that packet of data from the sending and receiving device of the central control system to the sending and receiving device of the regulating unit of the feed wagon, and the regulating unit of the feed wagon is configured to store that packet of data in the memory of the regulating unit, and the regulating unit of the feed wagon is configured to regulate the drive and control system of the feed wagon, on the basis of that packet of navigation data, for the running of the feed wagon from the feed loading site to the selected feed site or feed sites and possibly back to the feed loading site.

In this case, a user can select one or more feed sites in the central control system. The feed sites are located in the operating zone at a distance apart. On the basis of the selected feed site or feed sites, the central control system defines the packet of data, i.e. a part-collection of specific navigation data from the collection of all navigation data which are stored in the memory of the central control system, for example by combining specific navigation data into the packet of data or by selecting the packet of data from packets of data which have previously been stored in the memory of the central control system. The central control system next sends that packet of data via the sending and receiving devices to the regulating unit of the feed wagon. On the basis of that packet of data, the feed wagon autonomously travels to the one or more selected feed sites and possibly back again to the feed loading site. Once the feed wagon has returned to the feed loading site, the central control system can send a following packet of data, conforming to one or more further selected feed sites, to the regulating unit of the feed wagon. On the basis thereof, the feed wagon travels again autonomously to the one or more further selected feed sites. In the memory of the regulating unit of the feed wagon there is therefore only ever stored at most one packet of data, with which the feed wagon can travel from the feed loading site to the one or more selected feed sites, and possibly back again to the feed loading site.

According to the invention, it is here possible for the feed system to be provided with a plurality of feed alleys, which each comprise at least one feed site for the feeding of the animals. The feed alleys are located in the operating zone at a distance apart. The feed alleys run, for example, substantially parallel to one another. Along each feed alley are placed one or more feed sites for the feeding of the animals. A user can select one or more feed alleys in the central control system. On the basis of the selected feed alley or feed alleys, the central control system defines the packet of data which the central control system dispatches to the regulating unit of the feed wagon. On the basis of that packet of data, the feed wagon travels autonomously to the one or more selected feed alleys along the feed sites thereof and possibly back again to the feed loading site. Once the feed wagon has returned to the feed loading site, the central control system can transmit a following packet of data, conforming to one or more further selected feed alleys, to the regulating unit of the feed wagon. On the basis thereof, the feed wagon travels again autonomously to the one or more further selected feed alleys.

In one embodiment, the feed site or feed sites is/are placed in a shed, for example along the feed alley or feed alleys, wherein the shed is provided with a shed door which is drivable by a motor between an open position, in which the feed wagon can travel into the shed, and a closed position, in which the shed is closed by the shed door, and wherein the motor of the shed door is provided with a sending and receiving device which is configured to communicate, preferably wirelessly, with the sending and receiving device of the regulating unit of the feed wagon. The data which are stored in the memory of the central control system comprise operating data for the operation of the shed door. The packet of data which is transmitted from the sending and receiving device of the central control system to the sending and receiving device of the regulating unit of the feed wagon and is stored in the memory of the regulating unit of the feed wagon comprises these operating data. In other words, the operating data for the operation of the shed door are sent along with the packet of data. The regulating unit of the feed wagon is configured to transmit the operating data from the sending and receiving device of the regulating unit of the feed wagon to the sending and receiving device of the motor of the shed door for the operation of the shed door, in particular the opening of the shed door when the feed wagon is in front of the shed door in the closed position. The shed door can therefore be opened by communication between the sending and receiving devices of the motor of the shed door and the regulating unit of the feed wagon without intervention of the central control system. The shed door can hereby be situated without problems outside the transmission range of the sending and receiving device of the central control system.

In a preferred embodiment according to the invention, the feed storage system is configured to hold plurality of feed varieties which are placed separate from one another, wherein the data which are stored in the memory of the central control system comprise a plurality of rations for the animals, which each comprise ration data. One of the rations can be selected in the central control system. The central control system is configured to transmit the ration data of the selected ration together with the packet of navigation data from the sending and receiving device of the central control system to the sending and receiving device of the regulating unit of the feed wagon. In other words, the packet of data which is transmitted to the regulating unit of the feed wagon comprises the ration data. The packet of navigation data and ration data, and possibly further data, such as operating data, is stored in the memory of the regulating unit of the feed wagon. The regulating unit of the feed wagon is configured to regulate the feed loading device on the basis of the ration data of the selected ration such that the selected ration is placed in the holder of the feed wagon.

The feed storage system comprises, for example, a feed kitchen. The plurality of feed varieties can here be placed separate from one another on thee ground surface, such as (silage) grass, maize, hay, potato fibres and so on, and any chosen combination thereof. In the memory of the central control system, the rations and the associated ration data for the animals are stored. Following the selection of a specific ration, the ration data of that selected ration are transmitted from the central control system to the regulating unit of the feed wagon. After this, the regulating unit of the feed wagon forwards the ration data to the feed loading device. At first sight, it appears somewhat laborious to forward the ration data not directly from the central control system to the feed loading device, but via the regulating unit of the feed wagon. This has the advantage, however, that possible connection problems between the central control system and the feed loading device are immaterial, whilst the risk of connection problems between the regulating unit of the feed wagon and the feed loading device is minimal when the feed wagon is stationed at the feed loading site. It is hereby ensured that the ration data are passed on reliably. According to the invention, moreover, it is also possible for the ration data to be sent directly from the central control system to the feed loading device, without intervention from the regulating unit of the feed wagon, for example when the central control system is placed close to the feed loading device.

It is here possible for the feed loading device to be provided with a sending and receiving device which is configured to communicate, preferably wirelessly, with the sending and receiving device of the regulating unit of the feed wagon, and wherein the regulating unit of the feed wagon is configured to transmit the ration data of the selected ration from the sending and receiving device of the regulating unit of the feed wagon to the sending and receiving device of the feed loading device, and wherein the feed loading device is configured to, on the basis of the ration data of the selected ration, transfer quantities of the feed varieties from the feed storage system to the holder of the feed wagon such that the selected ration is received in the holder.

The feed loading device comprises, for example, a displaceable grab, which can respectively pick up a quantity of feed of a specific variety and transfer it to the holder of the feed wagon. According to the invention, it is also possible, however, for the feed wagon to comprise the feed loading device. If the feed loading device constitutes part of the feed wagon, the plurality of feed varieties, for example, are placed on the ground surface to form the feed storage system, and the feed loading site can extend over a zone which overlaps with the ground surface of the feed storage system. The packet of data can here comprise, in addition to the ration data, further navigation data, on the basis of which the feed wagon is capable of driving within the zone of the feed loading site to the plurality of feed varieties. As a result of the travel to the plurality of feed varieties and the take-up of quantities of feed with the integrated feed loading device of the feed wagon, the selected ration is received in the holder of the feed wagon.

According to the invention, it is possible for the drive and control system of the feed wagon to be provided with an electric drive motor and a battery system for the storage of electrical energy, which battery system is connected to the electric drive motor, and wherein the feed loading site is provided with a charging system for charging the battery system of the feed wagon. In this case, the feed loading site forms a charging site for charging the battery system of the feed wagon. The battery system is therefore charged while the holder of the feed wagon is loaded with feed. Since the loading with feed takes time, it is advantageous to use this time to charge the battery system.

In one embodiment of the invention, the feed wagon is provided with a mixing device for mixing feed which is held in the holder, and wherein the regulating unit of the feed wagon is configured to regulate the mixing device such that the mixing device mixes the feed held in the holder while the battery system of the feed wagon is charged by means of the charging system for the feed wagon. Since the mixing of the feed held in the holder consumes a relatively large amount of energy, it is favourable to carry out the mixing which the battery system is connected up to the power supply network. When the feed wagon travels away from the feed loading site, the charge level of the battery system is sufficiently high to travel to the feed site and possibly back.

According to the invention, it is preferable for the operating zone of the feed system to be provided with a plurality of beacons, wherein the feed wagon is provided with a sensor system for detecting the beacons, and wherein the navigation data which are stored in the memory of the central control system comprise beacon data of the beacons, and wherein the navigation data of the packet of data are provided with these beacon data, and wherein the regulating unit of the feed wagon is configured to regulate the drive and control system of the feed wagon on the basis of these beacon data and the detections of the sensor system. The beacons are placed at a fixed position in the operating zone of the feed system. The navigation data in the packet of data which is dispatched by the central control system to the regulating unit of the feed wagon comprises the beacon data. On the basis of that packet of data and by means of the sensor system of the feed wagon and the beacons in the operating zone, the regulating unit can run the feed wagon from the feed loading site to the feed site.

According to the invention, it is here possible for the beacons to be provided with a tag, placed in or on the ground surface, with a wall and/or with an impact point, and wherein the beacon data of the navigation data of the packet of data comprise the tracking of the tag by means of the sensor system of the feed wagon and/or the tracking of the wall by means of the sensor system of the feed wagon and/or the travel against an impact point which is detectable by the sensor system of the feed wagon. The feed wagon can also comprise a gyroscope, wherein the navigation data comprise the straight-ahead travel of the feed wagon, over a predefined distance, on the basis of the gyroscope. Of course, there are other options for enabling the feed wagon to find its way according to the invention.

According to the invention, it is preferable for the central control system to be configured to transmit the packet of data from the sending and receiving device of the central control system to the sending and receiving device of the regulating unit of the feed wagon while the feed wagon is stationed at the feed loading site. The packet of data is received by the sending and receiving device of the regulating unit and stored in the memory of the regulating unit before the feed wagon travels away from the feed loading site in order to cover the route to the feed site or feed sites. If the sending and receiving device of the central control unit is placed such that the feed loading site lies within the transmission range thereof, the connection between the sending and receiving devices of the central control unit and the regulating unit of the feed wagon is ensured as long as the feed wagon is stationed at the feed loading site. It is beneficial to reliability to then convey the packet of data.

According to the invention, it is possible for the central control system to be configured to transmit, in one go, the packet of data from the sending and receiving device of the central control system to the sending and receiving device of the regulating unit of the feed wagon. In this case, the entire packet of data is dispatched in one go, i.e. at a single point in time or within a short period, such as within a period of less than 1 second, for example by means of a single signal, from the sending and receiving device of the central control system to the sending and receiving device of the regulating unit of the feed wagon. Moreover, it is also possible, of course, for the entire packet of data to be transmitted in part-packets in the form of successive signals within a short period, such as within a period or less than 30 seconds or less than 10 seconds, preferably less than 1 second.

In one embodiment according to the invention, the data which are stored in the memory of the central control system comprise operating data for the operation of the dispensing device of the feed wagon, wherein the packet of data is provided with these operating data, and wherein the regulating unit of the feed wagon is configured to operate the dispensing device of the feed wagon on the basis of these operating data. If the packet of data comprises operating data for the operation of the dispensing device, the dispensing device of the feed wagon can dispense the feed from the holder of the feed wagon at the correct moment and at the correct feed site.

The invention likewise relates to a method for the feeding of animals, wherein use is made of a feed system as described above, wherein the central control system transmits the packet of data from the sending and receiving device of the central control system to the sending and receiving device of the regulating unit of the feed wagon, and the regulating unit of the feed wagon regulates the drive and control system of the feed wagon, on the basis of that packet of data, for the running of the feed wagon from the feed loading site to the feed site.

It is here preferable for the data which are stored in the memory of the central control system to comprise navigation data on the basis of which the feed wagon is capable of covering a route from the feed loading site to the feed site and back to the feed loading site, wherein the packet of data is provided with these navigation data, and the regulating unit of the feed wagon regulates the drive and control system of the feed wagon, on the basis of that packet of data, for the running of the feed wagon from the feed loading site to the feed site and back to the feed loading site, and wherein, after the feed wagon has returned to the feed loading site, the central control system transmits a further packet of data from the sending and receiving device of the central control system to the sending and receiving device of the regulating unit of the feed wagon, and wherein, on the basis of that further packet of data, the regulating unit of the feed wagon regulates the drive and control system of the feed wagon. The further packet of data comprises, for example, further navigation data for the running of the feed wagon from the feed loading site to another feed site. In addition, the further packet of data can comprise further ration data for the dispensing of a selected ration at this other feed site. The feed loading device can then be controlled again by the regulating unit of the feed wagon as described above.

The invention will now be explained in greater detail with reference to an illustrative embodiment represented in the drawing.

The FIGURE shows a schematic top view of an inventive feed system for the feeding of animals.

In the FIGURE, the feed system for the feeding of animals is denoted in its entirety by 1. The feed system 1 comprises an operating zone 2 having a ground surface. In the operating zone is located, in this illustrative embodiment, a feed storage system 10 and a shed 33. Of course, a house, one or more further sheds, barns and other buildings can possibly be found in the operating zone (not represented).

A self-propelled feed wagon 3 can be transported with wheels 6 over the ground surface of the operating zone. The feed wagon 3 comprises a holder 4 for the reception of feed and a mixing device for the mixing of that feed (not represented). For the dispensing of the feed from the holder 4, a dispensing device 5 is provided. The feed wagon 3 is transportable by means of a drive and control system for driving and controlling the feed wagon (not represented). The drive and control system of the feed wagon 3 can be regulated by a regulating unit 8 of the feed wagon 3. In this illustrative embodiment, the drive and control system comprises for each wheel 6 respectively an electric drive motor (not represented). The electric drive motors of the wheels 6 can be regulated independently of one another. Regulation of the rotation speed of the wheels 6 enables the feed wagon 3 to drive straight ahead, straight back or take a bend.

The drive and control system comprises a battery system for the storage of electrical energy (not represented). The battery system is connected to the electric drive motors. In the FIGURE, the feed wagon 3 is stationed at a feed loading site 11, in which the holder 4 of the feed wagon 3 is filled with feed. The feed loading site 11 comprises a loading point 26 of a charging system 25 for charging the battery system of the feed wagon 3. The regulating unit 8 of the feed wagon 3 is configured to regulate the mixing device such that the mixing device mixes the feed held in the holder 4 while the feed wagon 3 is connected to the loading point 26 and the battery system of the feed wagon 3 is charged by means of the charging system 25.

In this illustrative embodiment, the feed storage system 10 comprises a feed kitchen. The feed kitchen comprises a number of compartments 20 on the ground surface, in which different feed varieties are placed separate from one another. Of course, the feed storage system 10 can also be differently configured. A feed loading device 12 is provided to transfer feed from the feed storage system 10 to the holder 4 of the feed wagon 3 when the feed wagon 3 is stationed at the feed loading site 11.

In this illustrative embodiment, the feed loading device 12 comprises a movable supporting rail 21, which is placed displaceably (see arrow A) on two fixed supporting rails 23 which are placed parallel to each other and at a distance apart. The movable supporting rail 21 comprises a trolley 22 which is displaceable along the same (see arrow B), so that the trolley 22 can be placed above each of the compartments 20 containing feed varieties.

The trolley 22 is provided with a vertically displaceable grab (not represented) in order to grab feed from the compartments 20. That feed can subsequently be displaced to above the holder 4 of the feed wagon 3 and then be released by the grab. The transfer of plurality of feed varieties to the holder 4 of the feed wagon 3 produces a mix of feed varieties therein. The feed loading device 12 comprises a control unit 44.

Moreover, the feed loading device 12 could also be integrated with the feed wagon 3. In that case, the feed wagon 3 travels to the desired compartments 20 containing feed varieties, and the feed loading device of the feed wagon 3 loads the holder 4 with feed in the desired quantity and composition.

The feed storage system 10 is surrounded by a security fence 39. In the security fence 39 is placed an access door 40, so that a forklift truck or the like can enter the feed storage system 10 via the access door 40 in order to fill up the compartments 20 containing the feed varieties. In addition, the security fence 39 comprises an access door 41 for the feed wagon 3. The feed wagon 3 can travel into and out of the feed storage system 10 via the access door 41.

The shed 33 comprises a shed door 35 which can be driven by a motor 36 between an open position, in which the feed wagon 3 can travel into the shed 33, and a closed position, in which the shed 33 is closed by the shed door 35. In this illustrative embodiment, the shed 33 has two feed alleys 15. Of course, more or fewer feed alleys can be provided. Each feed alley 15 comprises a plurality of feed sites 14 for the feeding of the animals 19. The feed sites 14 are situated alongside stalls 18 for the animals 19. The stalls 18 extend substantially transversely to the feed alley 15. The animals 19 stand with their head facing the feed alley 15.

The feed sites 14 in the shed 33 lie at a distance from the feed loading site 11 within the feed storage system 10. The feed sites 14 are reachable from the feed loading site 11 by the feed wagon 3 being transported with its wheels 6 over the ground surface 3. In the operating zone 2, various beacons are placed. In this illustrative embodiment, the beacons are formed by tags 30, placed in or on the ground surface, by walls 31 of the shed 33 and by impact points 32. The feed wagon 3 comprises a sensor system (not represented), which is configured to interact with the beacons 30, 31, 32. In addition, the feed wagon 3 comprises a gyroscope (not represented) in order to travel straight-ahead over a predefined distance. The gyroscope is connected to the regulating unit 8 of the feed wagon 3.

The regulating unit 8 of the feed wagon 3 comprises a sending and receiving device 9. There is also provided a central control system 16, which comprises a sending and receiving device 17 which is configured to communicate wirelessly with the sending and receiving device 9 of the regulating unit 8 of the feed wagon 3, for example via Bluetooth. Although the central control system 16 is illustrated on the left in the FIGURE, the central control system 16 could also be placed at another location. In this illustrative embodiment, it is important that the central control system 16 is connected to the regulating unit 8 of the feed wagon 3 when the feed wagon 3 is stationed at the feed loading site 11.

The feed loading device 12 is likewise provided with a sending and receiving device 45, which is configured to communicate wirelessly with the sending and receiving device 9 of the regulating unit 8 of the feed wagon 3. Furthermore, the motor 36 of the shed door 35 comprises a sending and receiving device 37, which is configured to communicate wirelessly with the sending and receiving device 9 of the regulating unit 8 of the feed wagon 3.

The central control system 16 is provided with a memory, in which data are stored. The data which are stored in the memory of the central control system 16 comprise navigation data, ration data and operating data. The navigation data comprise beacon data of the beacons 30, 31, 32. On the basis of the navigation data, the feed wagon 3 is capable of covering various routes, for example a first route from the feed loading site 11 to the topmost feed alley 15 illustrated in the FIGURE, back and forth through this feed alley 15 and back to the feed loading site 11, and a second route from the feed loading site 11 to the bottommost feed alley 15 illustrated in the figure, back and forth through this feed alley 15 and back to the feed loading site 11. Of course, with the navigation data, further routes can be travelled, for example a so third route from the feed loading site 11 to the shed 33, through both feed alleys 15, possibly via the path 48 along the rear wall 31 and back to the feed loading site 11.

The ration data which are stored in the memory of the central control system comprise a plurality of rations for the animals. Each ration is defined by a total quantity of feed and the composition thereof, for example the total quantity of feed in kg and the formulation (relationship) or the number of kg per feed variety.

The operating data comprise, for example, operating data for the operation of the dispensing device 5 of the feed wagon 3 and operating data for the operation of the shed door 35. In addition, in this illustrative embodiment, the data which are stored in the memory of the central control system 16 also comprise operating data for the operation of the access door 41 of the security fence 39.

The central control system 16 comprises an input with which one of the rations and at least one of the feed alleys 15 can be selected in the central control system 16. Depending on the input, the central control system 16 defines a packet of data from the data stored in the memory of the central control system 16.

For example, the central control system 16 selects a part-collection of ration data from all the ration data on the basis of the selected ration, this part-collection of ration data being added to the packet of data. The central control system 16 can further select a part-collection of navigation data from all navigation data on the basis of the selected feed alley or feed alleys and add it to the packet of data. In this way, the packet of data is compiled on the basis of the input. As an alternative, predefined packets of data can be stored in the memory of the central control system 16, and the central control system 16 selects one of these packets of data on the basis of the input.

The central control system 16 is configured to transmit that packet of data from the sending and receiving device 17 of the central control system 16 to the sending and receiving device 9 of the regulating unit 8 of the feed wagon 3 while the feed wagon 3 is stationed at the feed loading site 11. The packet of data is transmitted in one go, i.e. at a single point in time or within a short period, such as within a period of less than 1 second, for example by means of a single signal. The regulating unit 8 of the feed wagon 3 comprises a memory in which that packet of data is stored. In the memory of the regulating unit 8 of the feed wagon 3 is therefore stored no more than the packet of data which is defined by the central control system 16 on the basis of the input.

The regulating unit 8 of the feed wagon 3 is configured to regulate the feed loading device 12 on the basis of the ration data of the selected ration such that the selected ration is placed in the holder 4 of the feed wagon 3 while the feed wagon 3 is stationed at the feed loading site 11. For this purpose, the regulating unit 8 of the feed wagon 3 sends the ration data of the selected ration from the sending and receiving device 9 of the regulating unit 8 of the feed wagon 3 to the sending and receiving device 45 of the feed loading device 12. On the basis of the ration data of the selected ration, the feed loading device 12 transfers quantities of the feed varieties from the compartments 20 to the holder 4 of the feed wagon 3 such that the selected ration is received in the holder 4.

After the holder 4 has been filled with the selected ration and mixing has taken place at the feed loading site 11, the regulating unit 8 of the feed wagon 3 regulates the drive and control system of the feed wagon 3 on the basis of the packet of data for the running of the feed wagon 3 from the feed loading site 11 to the selected feed alley 15 of feed alleys 15. The feed wagon 3 therefore travels autonomously, on the basis of the packet of data which is stored in the memory of the regulating unit 8 of the feed wagon 3, to the selected feed alley 15 or feed alleys 15. After all, that packet of data comprises navigation data on the basis of which the feed wagon 3 is capable of covering a route from the feed loading site 11 to the selected feed alley 15 or feed alleys 15. In this illustrative embodiment, the navigation data in the packet of data comprise the beacon data of the beacons 30, 31, 32 with which the feed wagon 3 can find its way by means of the sensor system. On the basis of the packet of data, the feed wagon 3 can also travel autonomously through this selected feed alley 15 or feed alleys 15, possibly via the path 48, and subsequently back to the feed loading site 11.

In order to obtain access to the shed 33, the packet of data comprises operating data for the operation of the shed door 35. The regulating unit 8 of the feed wagon 3 sends these operating data from the sending and receiving device 9 of the regulating unit 8 of the feed wagon 3 to the sending and receiving device 37 of the so motor 36 of the shed door 35 for the opening of the shed door 35 when the feed wagon 3 is standing in front of a closed shed door 35. Moreover, the access door 41 can be operable in the same way, so that the feed wagon 3 itself can communicate with the access door 41 in order, if so desired, to open/close this.

The feed system 10 can comprise, in addition to the security fence 39, further safety provisions, for example an emergency stop with which the feed wagon 3 and/or the feed loading system 12 is immediately stopped. In this context, an alarm can go off and/or a report can be dispatched to a user, for example.

The invention is not limited to the illustrative embodiment represented in the FIGURES. The person skilled in the art can make various modifications which lie within the scope of the invention. Beside the feed loading site 11 is found a second feed loading site 11 for a second feed wagon 3. In the feed system 1 according to the invention, two or more feed wagons 3 can be used simultaneously.

The invention claimed is:

1. A feed system for the feeding of animals, which feed system comprises:
   an operating zone having a ground surface;
   a feed wagon, said feed wagon being provided with:
     a holder for the reception of feed;
     a dispensing device for the dispensing of feed held in the holder;
     a plurality of wheels, said plurality of wheels being transportable over the ground surface;
     a drive and control system for driving and controlling the feed wagon; and
     a regulating unit, said regulating unit being provided with a sending and receiving device and being connected to the drive and control system for the regulation thereof;
   a feed storage system for holding at least one variety of feed;
   a feed loading site for the feed wagon, said feed loading site being located in the operating zone;
   a feed loading device, said feed loading device being configured to transfer feed from the feed storage system to the holder of the feed wagon when the feed wagon is stationed at the feed loading site;
   a feed site for the feeding of the animals, said feed site being located in the operating zone at a distance from the feed loading site, and being reachable for the feed wagon from the feed loading site by transporting of the feed wagon, with its wheels, over the ground surface; and
   a central control system, said central control system being provided with a sending and receiving device configured to communicate with the sending and receiving device of the regulating unit of the feed wagon,
   wherein the central control system is provided with a memory in which are stored data comprising navigation data on the basis of which the feed wagon is capable of covering a route from the feed loading site to the feed site, and the central control system is configured to transmit a packet of data comprising these navigation data from the sending and receiving device of the central control system to the sending and receiving device of the regulating unit of the feed wagon, and the regulating unit of the feed wagon is provided with a memory for the storage of that packet of data, and the regulating unit of the feed wagon is configured to regulate the drive and control system of the feed wagon, on the basis of that packet of data, for the autonomous running of the feed wagon from the feed loading site to the feed site.

2. The feed system according to claim 1, wherein the data which are stored in the memory of the central control system comprise navigation data on the basis of which the feed wagon is capable of covering a route from the feed loading site to the feed site and back to the feed loading site, and wherein the packet of data is provided with these navigation data, and the regulating unit of the feed wagon is configured to regulate, on the basis of that packet of data, the drive and control system of the feed wagon for the driving of the feed wagon from the feed loading site to the feed site and back to the feed loading site.

3. The feed system according to claim 2, wherein the feed system is provided with a plurality of feed sites, and wherein the data which are stored in the memory of the central control system comprise navigation data on the basis of which the feed wagon is capable of covering a route from the feed loading site to respectively at least one of the feed sites, and wherein at least one of the feed sites can be selected in the central control system, and wherein the central control system is configured to define a packet of data from the data stored in the memory of the central control system such that that packet of data is provided with navigation data on the basis of which the feed wagon is capable of covering a route from the feed loading site to the selected feed site or feed sites, and wherein the central control system is configured to transmit that packet of data from the sending and receiving device of the central control system to the sending and receiving device of the regulating unit of the feed wagon, and the regulating unit of the feed wagon is configured to store that packet of data in the memory of the regulating unit, and the regulating unit of the feed wagon is configured to regulate the drive and control system of the feed wagon, on the basis of that packet of navigation data, for the running of the feed wagon from the feed loading site to the selected feed site or feed sites.

4. The feed system according to claim 2, wherein the feed system is provided with a plurality of feed alleys, which each comprise at least one feed site for the feeding of the animals, and wherein the data which are stored in the memory of the central control system comprise navigation data on the basis of which the feed wagon is capable of covering a route from the feed loading site to respectively at least one of the feed alleys and at least partially through this feed alley, and wherein at least one of the feed alleys can be selected in the central control system, and wherein the central control system is configured to define a packet of data from the data stored in the memory of the central control system such that that packet of data is provided with navigation data on the basis of which the feed wagon is capable of covering a route from the feed loading site to the selected feed alley or feed alleys and at least partially through this selected feed alley or feed alleys, and wherein the central control system is configured to transmit that packet of data from the sending and receiving device of the central control system to the sending and receiving device of the regulating unit of the feed wagon, and the regulating unit of the feed wagon is configured to store that packet of data in the memory of the regulating unit, and the regulating unit of the feed wagon is configured to regulate the drive and control system of the feed wagon, on the basis of that packet of navigation data, for the running of the feed wagon from the feed loading site to the selected feed alley or feed alleys and at least partially through this selected feed alley or feed alleys.

5. The feed system according to claim 1, wherein the feed system is provided with a plurality of feed sites, and wherein the data which are stored in the memory of the central control system comprise navigation data on the basis of which the feed wagon is capable of covering a route from the feed loading site to respectively at least one of the feed sites, and wherein at least one of the feed sites can be selected in the central control system, and wherein the central control system is configured to define a packet of data from the data stored in the memory of the central control system such that that packet of data is provided with navigation data on the basis of which the feed wagon is capable of covering a route from the feed loading site to the selected feed site or feed sites, and wherein the central control system is configured to transmit that packet of data from the sending and receiving device of the central control system to the sending and receiving device of the regulating unit of the feed wagon, and the regulating unit of the feed wagon is configured to store that packet of data in the memory of the regulating unit, and the regulating unit of the feed wagon is configured to regulate the drive and control system of the feed wagon, on the basis of that packet of navigation data, for the running of the feed wagon from the feed loading site to the selected feed site or feed sites.

6. The feed system according to claim 1, wherein the feed system is provided with a plurality of feed alleys, which each comprise at least one feed site for the feeding of the animals, and wherein the data which are stored in the memory of the central control system comprise navigation data on the basis of which the feed wagon is capable of covering a route from the feed loading site to respectively at least one of the feed alleys and at least partially through this feed alley, and wherein at least one of the feed alleys can be selected in the central control system, and wherein the central control system is configured to define a packet of data from the data stored in the memory of the central control system such that that packet of data is provided with navigation data on the basis of which the feed wagon is capable of covering a route from the feed loading site to the selected feed alley or feed alleys and at least partially through this selected feed alley or feed alleys, and wherein the central control system is configured to transmit that packet of data from the sending and receiving device of the central control system to the sending and receiving device of the regulating unit of the feed wagon, and the regulating unit of the feed wagon is configured to store that packet of data in the memory of the regulating unit, and the regulating unit of the feed wagon is configured to regulate the drive and control system of the feed wagon, on the basis of that packet of navigation data, for the running of the feed wagon from the feed loading site to the selected feed alley or feed alleys and at least partially through this selected feed alley or feed alleys.

7. The feed system according to claim 1, wherein the feed site is placed in a shed, wherein the shed is provided with a shed door which is drivable by a motor between an open position, in which the feed wagon can travel into the shed, and a closed position, in which the shed is closed by the shed door, and wherein the motor of the shed door is provided with a sending and receiving device which is configured to communicate with the sending and receiving device of the regulating unit of the feed wagon, and wherein the data which are stored in the memory of the central control system comprise operating data for the operation of the shed door, and wherein the packet of data is provided with these operating data, and wherein the regulating unit of the feed wagon is configured to transmit these operating data from the sending and receiving device of the regulating unit of the feed wagon to the sending and receiving device of the motor of the shed door for the operation of the shed door.

8. The feed system according to claim 1, wherein the feed storage system is configured to hold a plurality of feed varieties which are placed separate from one another, and wherein the data which are stored in the memory of the central control system comprise a plurality of rations for the animals, which rations each comprise ration data, and wherein one of the rations can be selected in the central control system, and wherein the packet of data comprises the ration data of the selected ration, and wherein the regulating unit of the feed wagon is configured to regulate the feed loading device on the basis of the ration data of the selected ration such that the selected ration is placed in the holder of the feed wagon.

9. The feed system according to claim 8, wherein the feed loading device is provided with a sending and receiving device which is configured to communicate with the sending and receiving device of the regulating unit of the feed wagon, and wherein the regulating unit of the feed wagon is configured to transmit the ration data of the selected ration from the sending and receiving device of the regulating unit of the feed wagon to the sending and receiving device of the feed loading device, and wherein the feed loading device is configured to, on the basis of the ration data of the selected ration, transfer quantities of the feed varieties from the feed storage system to the holder of the feed wagon such that the selected ration is placed in the holder.

10. The feed system according to claim 8, wherein the feed wagon comprises the feed loading device.

11. The feed system according to claim 1, wherein the drive and control system of the feed wagon is provided with an electric drive motor and a battery system for the storage of electrical energy, which battery system is connected to the electric drive motor, and wherein the feed loading site is provided with a charging system for charging the battery system of the feed wagon.

12. The feed system according to claim 11, wherein the feed wagon is provided with a mixing device for mixing feed which is held in the holder, and wherein the regulating unit of the feed wagon is configured to regulate the mixing device such that the mixing device mixes the feed held in the holder while the battery system of the feed wagon is charged by means of the charging system.

13. The feed system according to claim 1, wherein the operating zone of the feed system is provided with a plurality of beacons, and wherein the feed wagon is provided with a sensor system for detecting the beacons, and wherein the navigation data which are stored in the memory of the central control system comprise beacon data of the beacons, and wherein the navigation data of the packet of data are provided with these beacon data, and wherein the regulating unit of the feed wagon is configured to regulate the drive and control system of the feed wagon on the basis of these beacon data and the detections of the sensor system.

14. The feed system according to claim 13, wherein each of the beacons are provided with one of a tag, which is placed in or on the ground surface, a wall or an impact point,
    wherein, when the beacon is provided with the tag, the beacon data of the navigation data of the packet of data comprises the tracking of the tag with the sensor system of the feed wagon,
    wherein, wherein when the beacon is provided with the wall, the beacon data of the navigation data of the packet of data comprises the tracking of the wall with the sensor system of the feed wagon, and
    wherein, when the beacon is provided with the impact point, the beacon data of the navigation data of the packet of data comprises the travel against an impact point which is detectable by the sensor system of the feed wagon.

15. The feed system according to claim 1, wherein the feed wagon is provided with a gyroscope, and wherein the navigation data of the packet of data comprise the straight-ahead travel of the feed wagon, over a predefined distance, on the basis of the gyroscope.

16. The feed system according to claim 1, wherein the central control system is configured to transmit the packet of data from the sending and receiving device of the central control system to the sending and receiving device of the regulating unit of the feed wagon while the feed wagon is stationed at the feed loading site.

17. The feed system according to claim 1, wherein the central control system is configured to transmit the packet of navigation data or ration data from the sending and receiving device of the central control system to the sending and receiving device of the regulating unit of the feed wagon.

18. The feed system according to claim 1, wherein the data which are stored in the memory of the central control system comprise operating data for an operation of the dispensing device of the feed wagon, and wherein the packet of data is provided with these operating data, and wherein the regulating unit of the feed wagon is configured to operate the dispensing device of the feed wagon on the basis of these operating data.

19. A method for the feeding of animals, comprising the steps of:
   using the feed system according to claim 1;
   transmitting with the central control system the packet of data from the sending and receiving device of the central control system to the sending and receiving device of the regulating unit of the feed wagon; and
   regulating with the regulating unit of the feed wagon the drive and control system of the feed wagon, on the basis of that packet of data, for the running of the feed wagon from the feed loading site to the feed site.

20. The method according to claim 19, wherein the data which are stored in the memory of the central control system comprise navigation data on the basis of which the feed wagon is capable of covering a route from the feed loading site to the feed site and back to the feed loading site, and wherein the packet of data is provided with these navigation data, and the regulating unit of the feed wagon regulates the drive and control system of the feed wagon, on the basis of that packet of data, for the running of the feed wagon from the feed loading site to the feed site and back to the feed loading site, and wherein, after the feed wagon has returned to the feed loading site, the central control system transmits a further packet of data from the sending and receiving device of the central control system to the sending and receiving device of the regulating unit of the feed wagon, and wherein, on the basis of that further packet of data, the regulating unit of the feed wagon regulates the drive and control system of the feed wagon.

* * * * *